United States Patent [19]

Willey

[11] 4,252,290
[45] Feb. 24, 1981

[54] MOTORCYCLE SAFETY MIRROR ASSEMBLIES

[76] Inventor: Barry A. Willey, 138 S. 8th Ave., Maywood, Ill. 60153

[21] Appl. No.: 920,366

[22] Filed: Jun. 29, 1978

[51] Int. Cl.³ .............................................. B60R 1/02
[52] U.S. Cl. ....................................... 248/549; 403/2
[58] Field of Search .......... 248/230, 548, 549, 475 R, 248/DIG. 9; 403/2; 52/98

[56] References Cited

U.S. PATENT DOCUMENTS

| | | | |
|---|---|---|---|
| 1,056,574 | 3/1913 | Newton | 248/230 |
| 1,310,323 | 7/1919 | Centolella | 248/230 |
| 1,796,093 | 3/1931 | Florman | 248/475 R X |
| 2,121,144 | 6/1938 | Fischer | 248/475 R |
| 2,171,078 | 8/1939 | Cline | 403/2 |
| 2,191,085 | 2/1940 | Rosen | 248/475 R |
| 2,249,848 | 7/1941 | O'Brien | 403/2 |
| 2,282,641 | 5/1942 | Corey | 403/2 X |
| 3,630,474 | 12/1971 | Minor | 52/98 |
| 3,635,435 | 1/1972 | Perison | 248/549 |
| 4,066,235 | 1/1978 | Hashiguchi | 248/549 X |

Primary Examiner—William H. Schultz
Attorney, Agent, or Firm—James T. FitzGibbon

[57] ABSTRACT

A safety mirror for cycles which includes a stem having a reduced diameter or breakaway portion lying adjacent the mounting portion of the stem and remote from the mirror head. The reduced diameter or breakaway portion preferably lies closely adjacent the upper surface of the locking nut.

5 Claims, 11 Drawing Figures

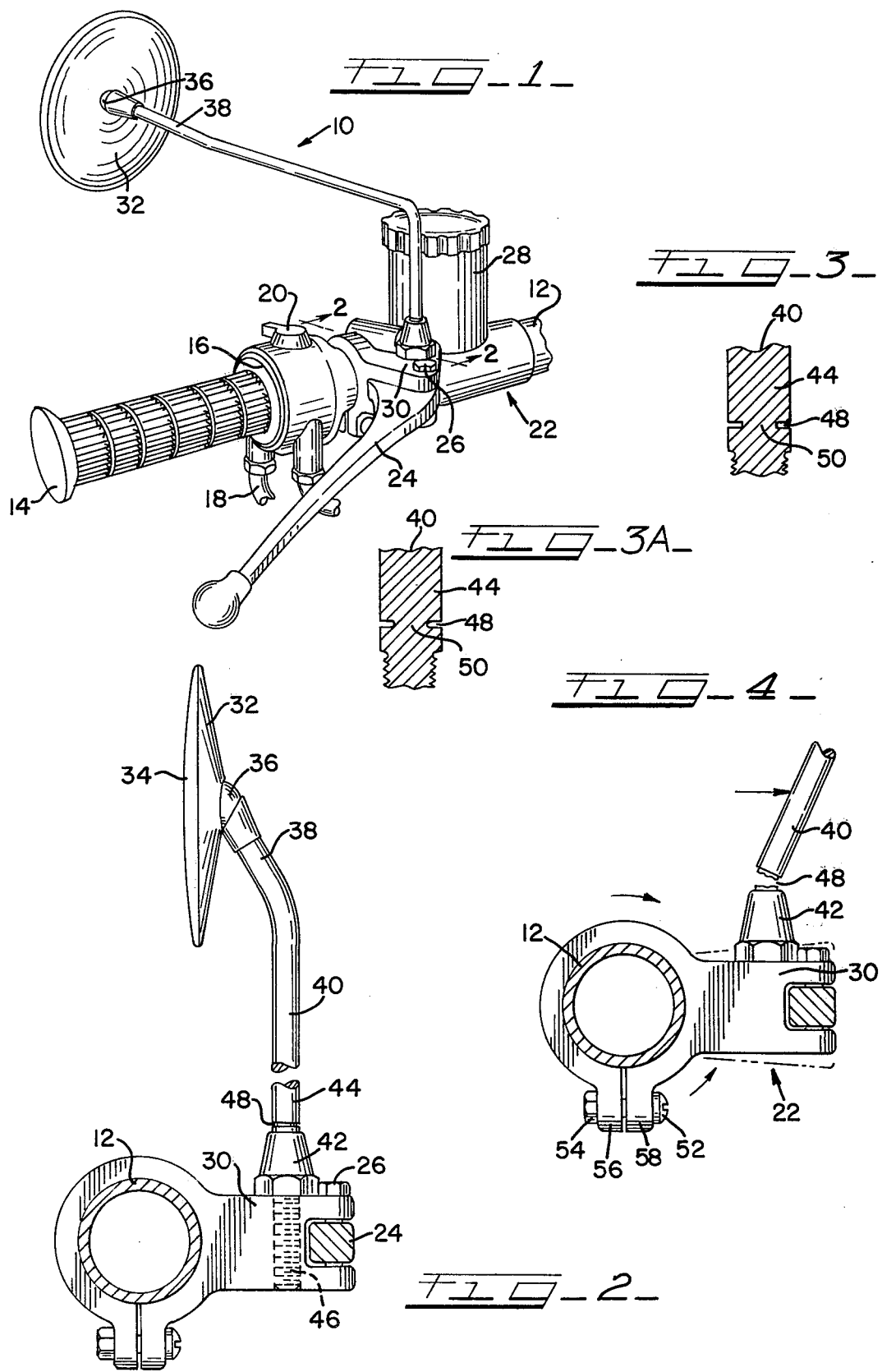

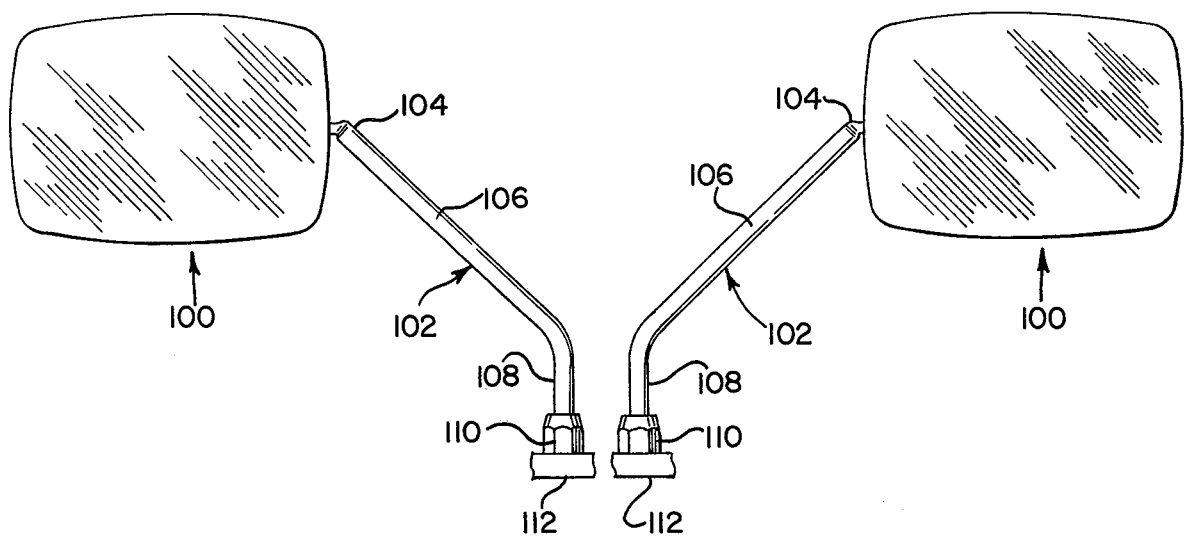
FIG-5-
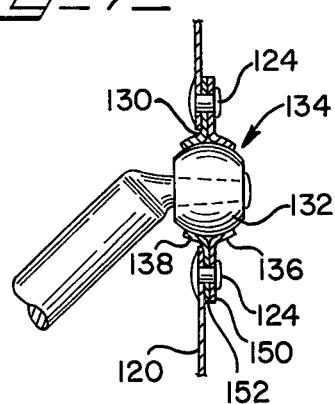
FIG-7-
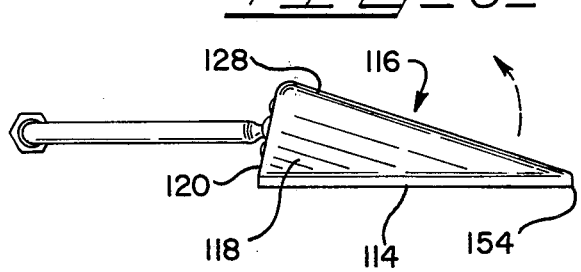
FIG-6-
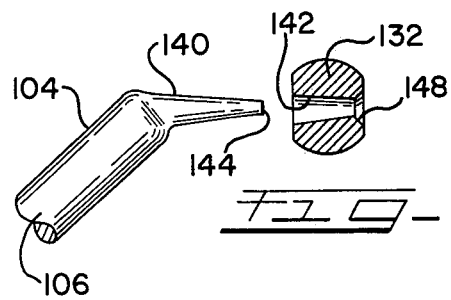
FIG-8-
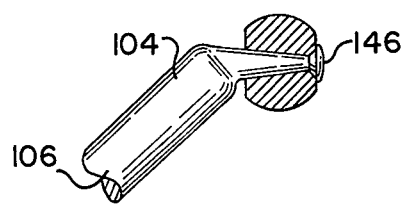
FIG-9-
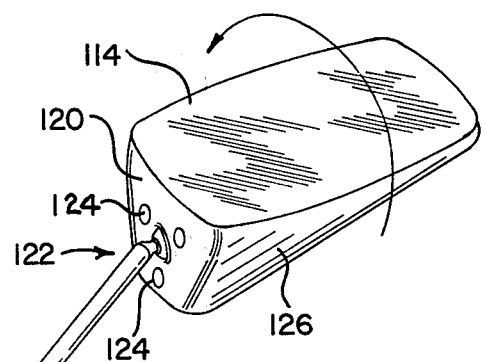
FIG-10-

MOTORCYCLE SAFETY MIRROR ASSEMBLIES

BACKGROUND OF THE INVENTION

The present invention relates generally to safety devices, and more particularly, to a specially constructed rear view mirror adapted for use on motorcycles and related vehicles.

The continuing concern with vehicle safety has now expanded to the point that there is a substantial and continuing interest in the safety of not only automobiles, but also motorcycles and related vehicles. Along these lines, significant efforts have been made to improve the so-called "crossworthiness" of motorcycles and the like vehicles, so as to avoid injury to the operator or passengers thereon.

While it is well known that motorcycles are in some respects safer than automobiles, insofar as they possess favorable potential for rapid maneuvering, and particularly, rapid braking, there is no question that motorcycles, in other respects, present safety hazards that are much greater than those associated with automobiles. In certain classes of motorcycle accidents, it has been found that motorcycle operators who might otherwise have been uninjured, or not injured seriously, have in fact been injured, and in some cases seriously, by contact with certain parts of the motorcycle itself. For example, it is generally accepted that, upon colliding with a fixed object, a motorcycle has a tendency to rotate upward and forwardly from the rear, tending to throw the passenger forward along or just over the gas tank, and ultimately, over the handlebars.

Certain constructions of safety devices have been made which take account of this problem, including the construction of windshields described in my patent application Ser. No. 685,707, filed May 12, 1976 now Pat. No. 4,082,345. This windshield construction is intended to avoid serious injuries to a motorcycle operator in a collision, where the rider is propelled forward and into contact with one or more of the braces which serve to hold the windshield in place.

A hazard of a similar kind exists with respect to motorcycle rear view mirrors which, in most if not all states, are required by law to be installed on motorcycles. While such mirrors are advantageous for their primary purpose, that is, to provide visibility to the rear of the motorcycle, such mirrors also present an injury hazard to a rider who may be thrown forward against and partially over such mirrors. In certain cases, a rider who might otherwise have escaped injury has been injured by receiving a blow in the face, eyes, shoulders, abdomen, or the like from a mirror mounted on the handlebars.

In automobiles, certain suggestions for breakaway or pivotable type mirror constructions have been made, and a certain number of these proposals have met with some success. However, the situation presented in automobiles and motorcycles are significantly different in at least several important respects.

First, a motorcycle mirror is almost always mounted in the wind stream of the vehicle, that is, it is mounted on the handlebars near the hand grips and extends either upwardly or upwardly and outwardly therefrom so that it provides a path of sight over the shoulders of the operator and to the rear thereof. As a result of being disposed in the air stream of the vehicle, a motorcycle mirror may not be loosely or pivotally mounted as can permissibly be the case with an automobile rear view mirror. Motorcycle mirrors, in normal use, are subjected to wind forces which may approach and even exceed velocities of 70–80 miles per hour or more. Accordingly, the concept of a pivotally mounted mirror has not proven generally successful for use with motorcycles subjected to reasonable speeds in traffic.

Another situation which is peculiar to many, if not all motorcycles, is the presence of vibration on a level which is much greater than that imposed upon an automobile.

For example, an automobile's mirror is commonly mounted on the windshield, dashboard, or headliner of the automobile. These parrts are isolated from the engine by rubber engine mounts, body mounts, and the like. Moreover, automobile engines are commonly well-balanced six and eight cylinder engines.

Motorcycles, on the other hand, often have the handlebars fastened directly to the frame just above the front wheel. Accordingly, wheel imbalance as well as engine vibration is transmitted quite directly to the handlebars and to the mirrors mounted thereon. In motorcycles of single and twin cylinder configurations, as well as a certain number of three and four cylinder motorcycles, engine vibrations are a common problem.

The extent of this problem is further aggravated because of the wide range of engine speed often encountered by small displacement engines. For example, it is not uncommon for ordinary motorcycle engines in completely stock condition to be adapted to operate at speeds up to 9,000 to 10,000 rpm or more. Consequently, loose or pivotal mounting of either the motorcycle mirror or the portion which in turn mounts the mirror to the handlebar simply does not prove satisfactory in use.

Those attempts which have been made to mount the mirror loosely so that it would be pushed out of the way in the event of an accident have failed for at least one and commonly two reasons. In the first place, loose mounting of the mirror invariably results in the mirror moving to a position in which it fails to serve its intended purpose. Secondly, as is most commonly the case, the mirror is in turn mounted on an assembly which includes means for mounting the clutch lever and the front brake lever. In those modern motorcycles, using hydraulic disc front brakes, the hydraulic reservoir is also mounted on the mirror mounting apparatus. Consequently, loose mounting of this entire subassembly with respect to the handlebar would be exceptionally dangerous from the standpoint of permitting the brake lever to rotate out of the position in which the driver is accustomed to find it. Also, such rotation raises the problem of moving the hydraulic controls for the front brake into an inoperative position. Accordingly, the mirror mounts have customarily been affixed quite rigidly to the handlebars, but such mounting, in the event of an accident creates a serious problem.

Other suggestions have been made in the prior art concerning safety mirror construction, at least one of which involves providing an area of weakness or reduced cross section within the threaded portion of the mirror mount. However, a solution of this sort is not practical for motorcycle applications. This is because, in use, motorcycle mirrors are commonly loosened from their locking nuts so as to be rotatable to an alternate position for loading and unloading the motorcycle, and for moving it into and out of storage and service areas. Consequently, the nut locking the mirror in place is locked and unlocked frequently. Moreover, because of the problems of vibration and wind force, it is customary to tighten the lock nut down with considerable force. Experienced motorcycle mechanics and riders periodically check the lock nuts on the mirrors to insure that they are sufficiently tight so that the mirror does not loosen in use and become worthless when it might be needed.

Therefore, constructing the threaded area of the mirror stem with a breakaway or cutdown portion is not satisfactory, since this would reduce the strength of the mirror where substantial strength is most needed.

In the design of a new motorcycle mirror embodying the safety feature referred to above, it is also possible to incorporate another desirable concept, namely, the production of a single mirror which will act as either a left- or right-handed mirror.

A problem which confronts accessory manufacturers and dealers is the need to stock both left- and right-handed mirrors for motorcycles. This need is particularly disadvantageous when there is no predetermined demand for either right- or left-handed mirrors, and no indication that the demand for one style or the other will predominate over any period of time or under any particular set of circumstances. Accordingly, an advantageous mirror is one which may be installed on either the left or right hand side of the motorcycle without compromising its ability to extend upwardly and outwardly from a mounting point on the handlebar end so as to provide both sturdy and convenient mounting and good visibility.

As is the case with auto parts, significant economy of manufacturing and stocking can be achieved if a single part can be adapted to both right and left hand locations.

In prior art motorcycle mirrors, whether or not purportedly safety mirrors, the mirror head has been mounted to the remote end of the stem by a swivel joint located generally centrally and toward the lower portion of the front surface of the rearview mirror. As a consequence, mirrors which are designed so as to extend both upwardly and outwardly, and to have their head portion affixed to the stem on the front surface of the mirror are not interchangeable as right and left hand mirrors.

Accordingly, distributors and manufacturers must make right and left hand mirrors and dealers and distributors must stock right and left hand mirrors. An advantage to one form of mirror made according to the present invention is that the same mirror may be made to serve both right and left hand installations even though the stem extends both upwardly and then upwardly and outwardly. This is accomplished by placing a pivot ball and socket or other pivot type joint in a sidewall portion of the mirror which is intentionally designated to have a head with a measurably forwardly extending sidewall portion. When the mirror is moved from a left to a right hand installation, or vice versa, the mirror head is merely rotated about its horixontal axis.

Bearing in mind the foregoing disadvantages of prior art mirrors and the failure to solve the problem of an economical but safe motorcycle mirror adapted to be highly useful even under adverse conditions, it is an object of the present invention to provide an improved motorcycle safety mirror.

It is a further object of this invention to provide a breakaway type mirror in which the mounting portion will separate from the mirror head and stem upon impact of a predetermined force.

A still further object is to provide a motorcycle safety mirror which will be sturdy and reliable in use, but which is constructed so as to break away upon receipt of a sharp blow under impact.

Another object is to provide a motorcycle which includes a zone or area of weakness at a predetermined point, but which does not compromise its strength for purposes of a firm mounting.

Another object is to provide a motorcycle safety mirror which is compatible with existing mounting units.

A still further object is to provide a motorcycle mirror which can be locked in place using significant torque but which will readily be broken upon impact of a predetermined magnitude.

Another object is to provide a motorcycle mirror having a stem with a groove of a diameter less than that of the root diameter of the threaded end of the mirror stem, and which may in one embodiment include relatively sharp inner margins for concentrating stresses in this area.

Another object is to provide a motorcycle safety mirror having a head, an elongated stem, a threaded end portion adapted to cooperate with the locking nut thereon, and in which a groove providing a breakaway or weakened zone is provided just above the upper surface of the lock nut when the mirror is in the normal position of use.

A still further object is to provide a motorcycle mirror wherein the stem, preferably a breakaway type stem, enters the mirror head assembly from the side so as to permit favorable positioning of the mirror and, preferably to permit the mirror to be positioned so that the same mirror can be used for both right and left hand sides of the motorcycle.

A still further object is to provide a mirror which is mounted so as to have the head portion thereof pivotally mounted to one end of the stem in a manner such that the mirror can rotate about a substantially horizontal axis with the mirror preferably having a ball and socket mounting to provide this feature.

The foregoing objects and advantages are achieved in practice by providing a mirror which in the normal position of use includes a stem having a threaded lower end portion received within a mounting bracket, a lock nut engaged with the threads and securing the stem to the mounting bracket, a zone of reduced cross section just above the top of the lock nut, and a mirror head disposed at the top of the stem and mounted for pivotal movement thereon.

Other objects are achieved by providing a motorcycle mirror constructed and arranged so that the head portion includes a stem receiving portion extending generally perpendicular to the plane of the reflective surface so that the mirror can be rotatable about a horizontal axis and thus made to serve as either a right- or left-handed mirror.

The manner in which these and other objects and other advantages of the invention are achieved in practice will become more clearly apparent when reference is made to the accompanying detailed description of the preferred embodiments of the invention set forth by way of example, and shown in the accompanying drawings where like reference numbers indicate corresponding parts throughout.

BRIEF DESCRIPTION OF THE DRAWINGS

FIG. 1 is a perspective view with parts broken away, showing the right hand end portion of the typical motorcycle handlebar and the safety mirror of the invention associated therewith in a position of use;

FIG. 2 is a side view, partly in elevation and partly in section, showing the mirror portions broken away and the means for mounting the mirror to the cycle handlebar;

FIG. 3 is a sectional view, on an enlarged scale, of the intentionally weakened mirror stem;

FIG. 3A is a sectional view, on an enlarged scale, showing another form of weakening groove formed in the stem of the mirror of the invention;

FIG. 4 is a side view, partly in elevation and partly in section, showing the manner in which the safety mirror of the present invention will break away in the event of receiving a sharp, forwardly directed blow.

FIG. 5 is an elevational view, taken from the rear, of a pair of mirrors made according to the invention and illustrating the configuration of the mirrors installed as both left and right hand parts;

FIG. 6 is a top plan view of a rearview safety mirror made according to the invention;

FIG. 7 is an enlarged fragmentary view, with portions broken away, partly in elevation and partly in section, and showing one manner of mounting the mirror head sidewall to the mirror stem.

FIG. 8 is a view of the stem and ball portion of the assembly of FIG. 7, showing the ball and section before the stem is inserted therein and before the head portion is formed on the stem end.

FIG. 9 is a view similar to that of FIG. 8, but showing the parts assembled to each other; and FIG. 10 is a perspective view of the mirror of the invention showing the manner of rotating the mirror head about its horizontal axis so as to convert it from a left hand to a right hand mirror or vice versa.

DESCRIPTION OF THE PREFERRED EMBODIMENTS OF THE INVENTION

While it will be understood that the principles of the present invention are applicable to various forms of mirror devices, a description of one form of mirror will be given in which it is assumed that the mirror extends generally upwardly from the mounting bracket and that the mounting bracket is fixed adjacent or nearly adjacent the hand grip disposed on one or both ends of a motorcycle handlebar.

Referring now to the drawings in greater detail, FIG. 1 shows a mirror of the invention, generally designated 10, to be associated in use with the end portion 12 of a motorcycle handlebar. The handlebar end 12 includes a hand grip 14, a collar assembly 16 which includes means 18 in the form of a pair of cables for controlling the throttle of the machine and a safety on-and-off switch 20.

Disposed inboard of these elements is a collar or like mounting assembly generally designated 22 and adapted for mounting (a) the front brake lever 24, which pivots about a shoulder-type bolt 26, (b) a hydraulic brake fluid reservoir 28, and (c) the mirror 10 which is secured to the forwardly extending portion 30 of the mounting collar or bracket 22. The mirror itself, as shown in FIG. 2, includes a head element 32 which contains the glazed portion 34 of the mirror. A swivel mount 36 is disposed at the upper end 38 of the mirror stem 40.

A lock nut 42 is disposed adjacent the lower end 44 of the mirror stem 40. The end 44, which may be referred to as the end remote from the head, as shown, terminates in a threaded end portion 46. This threaded end 46 is received within an opening in the forwardly extending portion 30 of the bracket 22, where it is held locked in place by the nut 42. For initial angular mirror adjustment, the locknut 42 is loosened and the mirror is turned within the threaded opening; thereafter, the nut 42 is again tightened and the mirror will remain locked in place in the desired position of use.

FIG. 2 shows that the clamp 22 is held to the handlebar end 14 by reason of the locking bolt 52 and the nut 54 therefor engaging each other and acting through the two clamp flanges 56, 58 pulling the clamp into snug engagement with the bar end 14.

Referring now to FIGS. 2 and 3, FIG. 2 shows that there is an area of reduced cross section 48 disposed just above the upper portion of the locknut 42 in the lower or remote end 44 of the mirror stem 40. As shown in FIG. 3, this notch 48 extends entirely around the circumference of the mirror stem and, according to the invention, the groove 48 is at a depth which is substantially greater than the depth of the threads; the residual metal inside the groove 48 is of a smaller diameter than the root diameter of the threads.

In a typical embodiment, the diameter of the mirror stem 40 is ten millimeters, or 0.393 inches. The groove is 0.080 inches, or about two millimeters deep. Accordingly, the portion 50 of the mirror stem 40 which remains inside the notch or groove 48 has a diameter of about 0.233 inches, that is, $0.393 - (2 \times 0.080)$ inches.

In the form of invention shown in FIG. 3A, the groove 48 has a slight radius at its inner end, to avoid raising excessive stress concentration in this area. Accordingly, the mirror will not break accidentally or fail when impacts are applied which are of a force considerably less than those that are capable of causing injury, and which might be encountered in the normal use of the mirror. Such forces might be those encountered in removing, loosening or tightening the mirror by hand, or in repositioning it while loading the motorcycle or the like, for example.

Referring now to FIG. 4, the operation of the breakaway mirror is shown. It will be assumed that the mirror head 32 and stem 40 are struck a blow from the rear. These forces tend to rotate the mounting assembly 22 down and forwardly, or clockwise as shown in FIG. 4, but these forces are resisted by the torque reaction shown by the arrow beneath the mounting assembly. Consequently, either no movement, or only the limited amount of movement shown in the phantom lines, occurs when the mirror is struck by an operator or passenger passing forwardly in the direction of the upper arrow. Therefore, these forces are concentrated into the area adjacent the groove 48, and the mirror will snap cleanly just above the top surface portion of the locknut 42. The portion remaining is a relatively blunt portion protected by the locknut 42, while the remainder or projecting portion of the mirror falls forward and loses its injury-inflicting potential.

In the preferred form of invention, the groove 48 is placed just above the top of the locknut and above the threaded portion of the mirror stem 40. Preferably, this distance is in practice very slight, such as about one-sixteenth to one-eighth of an inch above the top of the nut, but not therebelow. Since the exact depth to which the mirror may be inserted is not known with certainty, however, the groove is placed about one-eighth of an inch above the point at which it would be flush, were the mirror to be installed with full but not excessive engagement of the threads with the tapped opening.

In another embodiment of the invention FIG. 3A, particularly one wherein the mirror stem may be made from an unusually hard material, or have a larger diameter, the inner portion edges of the groove 48 may be made relatively sharp, thus raising stress concentrations in the area of the cut, and insuring fracture in the desired area. However, with the dimensions referred to above, the mirror has proved more successful using a slightly radiused or curved interim groove configuration. While the mirrors of the invention may be made by various techniques, the preferred method is to make the cut which forms the groove 48 on the same automatic screw machine in which the shanks of the mirrors are threaded. Accordingly, the manufacture of the mirror is simple and may be done on the same machines, in the same manner as making mirrors not having the advantages of the present invention.

As pointed out above, an important feature of the invention is that the metal remaining inside the groove 48 be measurably smaller than the root diameter of the threads, thus resisting any tendency of the mirror to break elsewhere and insuring that maximum strength consistent with thread size is provided for purposes of locking the mirror as required by normal use.

The head of the mirror may be either of the radiused (convex) type or may be a flat or non-magnifying type mirror. The remaining portions of the mirror are of the conventional type known to those skilled in the art.

Referring now to FIGS. 5–10, a form of mirror is shown which may advantageously include the features of the mirror of FIGS. 1–4, but which also provides a mirror head and stem construction rendering the unit capable of use as either a left hand or right hand handlebar mirror. As shown in FIG. 5, both right and left hand mirrors include mirror head assemblies generally designated 100 and stem assemblies 102, with the stem assemblies 102 including upper or outer ends 104, centrally upwardly and outwardly extending stem portions 106, generally vertically extending lower portions 108, and lock nuts 110 adapted to lock the mirrors in place in brackets 112 or the like. It will be understood that such brackets 112 are drilled and tapped in a manner similar to the bracket 30 in FIGS. 1, 2 and 4, for example.

The mirrors 100 of this form of the invention may, but need not, include the breakaway feature of the other embodiment, and if they include such feature, they will possess the additional safety features of the mirror shown in FIGS. 1–4.

Referring now to FIGS. 6 and 10 the mirror assembly is shown to include a reflective element 114 which is preferably planar or convex silvered glass, but which may be made of other suitable reflective material. The reflective element 114 is disposed for use within a housing portion generally designated 116 and shown to include a top surface 118, a sidewall portion 120 having a ball and socket ball generally indicated 122 therein, portions of which are held in place by rivets or other fasteners 124. The mirror also includes a lower surface portion 126 which is similar to the top surface 118, and a generally forwardly facing, outwardly tapering surface 128.

Consequently, the mirror housing includes, in the form shown, a single inner sidewall 120, extending generally but not exactly perpendicular to the plane of the reflector 114, top and bottom tapered walls 118, 125 and a generally forwardly facing wall 128. While the mirror might have an outer wall corresponding to the inner sidewall 120, such extra wall is not necessary, and is thus omitted in the form shown. It will be understood that, provided that the wall 120 is included and positioned so as to receive the pivotal mounting to be described, the number and exact location of other walls are not essential features of the invention.

Referring now to FIGS. 7–9, the preferred manner of mounting the end 104 of the stem 102 to the housing 116 is shown. The sidewall 120 includes a circular margin 130 defining an opening into which a ball 132 is inserted. The ball 132 is journalled in a socket 134 comprised of inner and outer, annular flanges 136–138 having partially spherical, inwardly directed surfaces adapted to receive the ball in snug relation.

As shown in detail in FIGS. 8 and 9, the outer end 104 of the stem 106 terminates in a tapering nose portion 140. This nose is placed into the frusto-conical recess 142 in the ball 132, and the end portion 144 of the nose 140 is then staked so as to form a head 146 received in the countersunk portion 148 of the ball 132. FIG. 9 shows the ball held in snug relation over the headed nose portion 140 of the stem 102.

In assembling the head to the stem after the ball is staked over the end 104 of the stem 106, the inner and outer flanges 136, 138 are placed over the ball end, and the radially extending portions 150, 152 respectively of the flanges 136, 138 (FIG. 7) are then affixed to each other and to the sidewall 120 by inserting headed rivets 124 in suitable openings. The flanges and ball are suitably sized so that the joint thus formed is stiff but movable.

FIG. 10 shows that, once assembled, the mirror head assembly 100 may be turned about its horizontal axis, whereupon the mirror may then be used in the opposite hand installation. By way of further example, if the left hand mirror shown in FIG. 5 were to have its head portion rotated about a horizontal axis, it would appear to have the forward portion facing to the rear. If the stem were then rotated 180°, the mirror would look like the mirror on the right hand side of FIG. 5, that is, it would be a right hand mirror.

In the embodiment shown, the sidewall 120 of the mirror head 100 is disposed at an angle of about 75° from the plane of the reflective surface 114 of the mirror, measured inside the mirror housing. The angle between such sidewall 120 and the plane of the mirror should preferably be between 75° and 105°, and in any case, should be such that the mirror sidewall extends generally forwardly in use. This permits the swivel action to permit adjusting the mirror to serve its intended purpose.

The simplest case would be that of disposing the sidewall exactly perpendicular to the mirror surface, but this construction would make the housing somewhat boxy and less streamlined. It is basically essential only that the pivot be arranged to permit rotation of the mirror about the axis of the joint without interference, and permit a desirabel viewing angle to be obtained between the stem end or swivel and the mirror head sidewall, so the user can look to the rear of the vehicle.

An additional safety feature of the mirror made according to the embodiment of the invention is that a certain amount of front to rear tilting action may take place about the pivot joint of the mirror, with the outer edge 154 moving forward so as to relieve a force which is strongly applied from the rear.

Mirrors made according to the concepts of FIGS. 5-10 have proved safe and effective in use, and, by providing left and right hand interchangeability, have included an important additional advantage of versatility for the manufacturer, distributor, and dealer. This enables dealers to cut their mirror stock substantially, while still maintaining the potential for supplying the same numerical mirror demand.

It will thus be seen that the present invention provides a novel breakaway safety mirror assembly having right and left hand interchangeability and having a number of other advantages and characteristics, including those pointed out above, and others which are inherent in the invention. Several preferred embodiments of the invention having been described by way of illustration, it is anticipated that changes and modifications of the described mirror will occur to those skilled in the art and that such changes and modifications may be made without departing from the spirit of the invention or the scope of the appended claims.

I claim:

1. A breakaway safety mirror assembly for a motorcycle comprising, in combination, a mirror head frame having a mirror glass received therein, a mirror stem portion attached to and extending from said head portion, said stem having an end portion proximate to said head and an end portion remote therefrom, said remote portion including a threaded portion engagable with a tapped portion of a mirror support member received over a motorcycle handlebar, locking means received over said threaded portion and adapted to be rotated into a position of snug locking engagement when said threaded portion of said stem is received in said tapped opening, and means defining an area of reduced cross section in said remote end portion, said area of reduced cross section, in the installed position of said mirror, being spaced from said threaded area and lying just axially outside said locking means, said area of reduced cross section having a diameter smaller than the root diameter of said threads on said end portion.

2. A mirror assembly as defined in claim 1 wherein said means defining said areas of reduced cross section comprises a groove having closely axially spaced apart sidewalls and a radially inner end wall, said walls being joined to each other by relatively rounded marginal portions, thereby minimizing stress concentrations adjacent said groove.

3. A mirror assembly as defined in claim 1 wherein said means defining said areas of reduced cross section comprises a groove having closely axially spaced apart sidewalls and a radially inner end wall, said walls being joined to each other along sharply angled surfaces, thereby raising stress concentrations in the vicinity of said groove.

4. A mirror assembly as defined in claim 1 wherein said locking means is in the form of a nut having a tool-engaging base portion and a body portion extending axially thereof, said body portion tapering radially inwardly toward a reduced diameter just greater than that of the diameter of said stem adjacent an end portion of said nut.

5. In combination, a safety mirror as defined in claim 1 and a handlebar mount for said mirror, said handlebar mount including a generally cylindrical portion adapted to embrace a handlebar in snug relation, and means for compressively reducing the diameter of said mount so as to secure the same to said handlebar.

* * * * *

UNITED STATES PATENT AND TRADEMARK OFFICE
CERTIFICATE OF CORRECTION

PATENT NO. : 4,252,290

DATED : February 24, 1981

INVENTOR(S) : Barry A. Willey

It is certified that error appears in the above—identified patent and that said Letters Patent is hereby corrected as shown below:

Column 1, line 14, "crossworthiness" should be -- crashworthiness --;

Column 7, line 5, after "invention", the words "FIG 3A" should be deleted and in place thereof insert -- (FIG. 3) --;

Signed and Sealed this

Twenty-sixth Day of May 1981

[SEAL]

*Attest:*

RENE D. TEGTMEYER

*Attesting Officer*  *Acting Commissioner of Patents and Trademarks*